United States Patent
Girgensohn et al.

(10) Patent No.: US 10,726,511 B2
(45) Date of Patent: Jul. 28, 2020

(54) SYSTEMS AND METHODS FOR TRACKING COPYING OF PRINTED MATERIALS OWNED BY RIGHTS HOLDERS

(71) Applicant: FUJI XEROX CO., LTD., Tokyo (JP)

(72) Inventors: Andreas Girgensohn, Palo Alto, CA (US); Lynn Donelle Wilcox, Redwood City, CA (US); Scott Carter, Mountain View, CA (US); Kishore Papineni, Sydney (AU)

(73) Assignee: FUJI XEROX CO., LTD., Tokyo (JP)

( * ) Notice: Subject to any disclaimer, the term of this patent is extended or adjusted under 35 U.S.C. 154(b) by 174 days.

(21) Appl. No.: 15/928,112

(22) Filed: Mar. 22, 2018

(65) Prior Publication Data
US 2019/0295200 A1    Sep. 26, 2019

(51) Int. Cl.
  *G06K 9/00*     (2006.01)
  *G06Q 50/18*    (2012.01)
  *G06F 16/583*   (2019.01)

(52) U.S. Cl.
  CPC ....... *G06Q 50/184* (2013.01); *G06F 16/5846* (2019.01); *G06K 9/00483* (2013.01)

(58) Field of Classification Search
  CPC combination set(s) only.
  See application file for complete search history.

(56) References Cited

U.S. PATENT DOCUMENTS

| | | | |
|---|---|---|---|
| 5,299,026 A | 3/1994 | Vincett | |
| 5,530,520 A * | 6/1996 | Clearwater | G03G 15/507 358/462 |
| 6,135,646 A | 10/2000 | Kahn | |
| 6,711,293 B1 | 3/2004 | Lowe | |
| 7,363,278 B2 | 8/2008 | Schmelzer | |
| 8,805,117 B2 | 8/2014 | Liu et al. | |
| 2007/0171288 A1* | 7/2007 | Inoue | G06T 1/0064 348/241 |
| 2008/0069456 A1* | 3/2008 | Perronnin | G06K 9/4671 382/228 |
| 2013/0022280 A1* | 1/2013 | Liu | G06K 9/4671 382/224 |
| 2013/0114848 A1* | 5/2013 | Petrovic | G06K 9/6206 382/100 |
| 2016/0148074 A1* | 5/2016 | Jean | G06F 16/5838 382/190 |

* cited by examiner

*Primary Examiner* — Alex Kok S Liew
(74) *Attorney, Agent, or Firm* — Procopio, Cory, Hargreaves & Savitch LLP

(57) ABSTRACT

Rights holders such as copyright owners want to keep track of copying of printed materials owned by them. That information can be used to check if the person copying has a license. Alternatively, the information can be used for billing. In some countries, an intermediary such as a copyright agency may facilitate the tracking of such copying and the compensation of the rights holders. This system automates the process by monitoring copiers, matching copied images to materials owned by rights holders, and recording such copying actions including the identifier of the copier, the copying person, the number of copies, and the matched materials. Alternatively, the system may prevent the copying if there is no permission by the rights holders.

18 Claims, 7 Drawing Sheets

| 7 | 4 | 11 | 2 | 17 | 6 | 19 | 123 |
|---|---|----|---|----|---|----|-----|
| 1 | 14 | 9 | 3 | 18 | 6 | 1 | 201 |
| 2 | 13 | 9 | 3 | 18 | 5 | 1 | 201 |
| 8 | 14 | 12 | 5 | 2 | 12 | 17 | 57 |

FIG. 6

SYSTEMS AND METHODS FOR TRACKING COPYING OF PRINTED MATERIALS OWNED BY RIGHTS HOLDERS

BACKGROUND OF THE INVENTION

Technical Field

The disclosed embodiments relate in general to techniques for content rights management and, more specifically, to systems and methods for tracking the copying of printed materials owned by rights holders.

Description of the Related Art

Rights holders of printed materials want to be compensated for the use of copies of those materials or be able to prevent copying thereof. Conventional copying technology may require manual record keeping of all copying activity based on an honor system. To improve efficiency and compliance, an automatic system attached to multifunction copiers is desirable. When copying copyrighted material such as books and magazines, the copied image is close to the original but may have minor imperfections due to the resolution of the copier, rotation, and smudges. In the case of books, two pages may be copied at the same time and bending the spine of the printed material may cause distortions. An automated system would have to be able to handle a database with millions of pages and efficiently match copies against the database with very high accuracy. While normally the whole page would be matched, it may be desirable just to look at parts of a page to locate the use of logos, stamps, etc. If page images are available only for a subset of the copyrighted materials, statistics of clusters of encountered images can be maintained to discover images of copyrighted pages.

In view of the aforesaid shortcomings of the conventional copying technology, there is a strong need in the art for systems and methods for tracking the copying of printed materials owned by rights holders.

SUMMARY OF THE INVENTION

The embodiments described herein are directed to methods and systems that substantially obviate one or more of the above and other problems associated with conventional technology for tracking the copying of printed materials owned by rights holders.

In accordance with one aspect of the inventive concepts described herein, there is provided a computer-implemented method for tracking copying of a printed material owned by a rights holder, the computer-implemented method being performed in connection with a computerized system comprising a central processing unit and a memory, the computer-implemented method comprising: retrieving an image from a copy device; performing image processing to obtain a digital fingerprint for the retrieved image; and matching the obtained digital fingerprint with fingerprints of a plurality of copyrighted images.

In one or more embodiments, the aforesaid matching is a full-page matching.

In one or more embodiments, the method further comprises: if no match is found, matching the obtained digital fingerprint with fingerprints of a plurality of unknown images; and adding the retrieved image into the plurality of unknown images.

In one or more embodiments, the aforesaid matching is a full-page matching.

In one or more embodiments, the method further comprises, upon adding of the retrieved image into the plurality of unknown images, clustering the retrieved image and at least some of the plurality of unknown images into one or more clusters of near-duplicate images.

In one or more embodiments, the clustering is based on a similarity between the retrieved image and the unknown images in the plurality of unknown images.

In one or more embodiments, the method further comprises grouping clusters of near-duplicate images into temporal cluster sequences based on a temporal proximity between pairs of unknown images within different clusters of near-duplicate images.

In one or more embodiments, the method further comprises selecting a representative document for the near-duplicate image cluster.

In one or more embodiments, the method further comprises displaying the representative document for the near-duplicate image cluster to a user.

In one or more embodiments, the method further comprises, for each displayed representative document, receiving user designation of the displayed representative document as being copyrighted or non-copyrighted.

In one or more embodiments, the method further comprises, if the user designated the displayed representative document as being copyrighted, removing the near-duplicate image cluster from the plurality of unknown images and placing the near-duplicate image cluster into the plurality of copyrighted images.

In one or more embodiments, the method further comprises, if the user designated the displayed representative document as being non-copyrighted, removing the near-duplicate image cluster from the plurality of unknown images.

In one or more embodiments, the matching comprises: generating a vocabulary of visual words in the plurality of unknown images; extracting image features for image key points for each of the plurality of unknown images; based on the extracted image features, creating an index pointing from the visual words in the vocabulary to images from the plurality of unknown images, which contain these visual words; using the created index to collect all other images of the plurality of unknown images that share at least one visual word with the retrieved image and determining a number of shared visual words; and performing a geometric verification to verify whether the shared visual words are located at same locations in the retrieved image and the other images of the plurality of unknown images and taking a fraction of verified shared visual words to all shared visual words as a similarity measure.

In one or more embodiments, the vocabulary of visual words is generated from a set of image features extracted from a collection of representative images.

In one or more embodiments, the plurality of unknown images is stored in an unknown image database.

In one or more embodiments, the method further comprises, if a match is found, generating a notification to the rights holder.

In one or more embodiments, the method further comprises, if a match is found, preventing the copy device from copying the retrieved image.

In one or more embodiments, the method further comprises, if a match is found, generating a report comprising information on the copying of the retrieved image by the copy device.

In one or more embodiments, the plurality of copyrighted images is stored in a copyrighted image database.

In accordance with another aspect of the inventive concepts described herein, there is provided a computerized system for tracking copying of a printed material owned by a rights holder, the computerized system comprising a central processing unit and a memory storing a set of computer-executable instructions for: retrieving an image from a copy device; performing image processing to obtain a digital fingerprint for the retrieved image; and matching the obtained digital fingerprint with fingerprints of a plurality of copyrighted images.

In accordance with yet another aspect of the inventive concepts described herein, there is provided a non-transitory computer-readable medium embodying a set of computer-executable instructions, which, when executed in a computerized system comprising a central processing unit and a memory, cause the computerized system to perform a method for tracking copying of a printed material owned by a rights holder, the method comprising: retrieving an image from a copy device; performing image processing to obtain a digital fingerprint for the retrieved image; and matching the obtained digital fingerprint with fingerprints of a plurality of copyrighted images.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically:

FIG. 6 illustrates an example of four descriptor vectors with the corresponding visual words.

DETAILED DESCRIPTION

Figure 1:
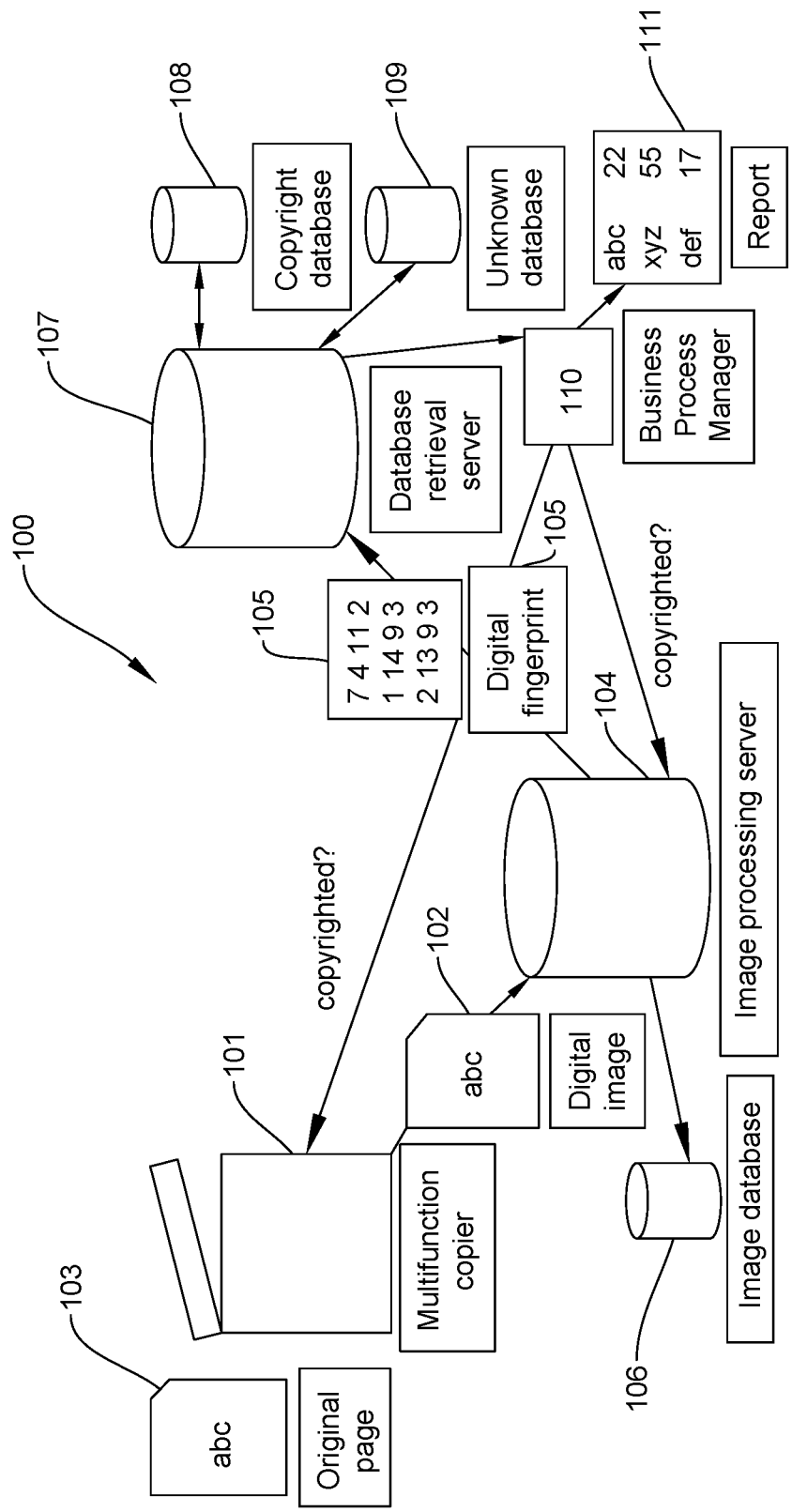
FIG. 1 illustrates components of an exemplary embodiment of the described system for tracking the copying of printed materials owned by rights holders.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general-purpose computer, in the form of a specialized hardware, or combination of software and hardware.

Rights holders such as copyright owners want to keep track of copying of printed materials owned by them. That information can be used to check if the person copying has a license. Alternatively, the information can be used for billing. In some countries, an intermediary such as a copyright agency may facilitate the tracking of such copying and the compensation of the rights holders.

In one or more embodiments, the described system automates the process by monitoring copiers, matching copied images to materials owned by rights holders, and recording such copying actions including the identifier of the copier, the copying person, the number of copies, and the matched materials. Alternatively, an embodiment of the system may prevent the copying if there is no permission by the rights holders.

In one or more embodiments, the described system consists of several components. A monitoring system communicates with a copier to receive information such as the copied images, the copy count, and the identity of the person making the copies. The images are processed to facilitate matching against near-duplicate images in a database representing pages of printed materials owned by rights holders. Matches in the database may be recorded together with the data about the copying process. Alternatively, business logic may determine unauthorized copying and communicate that decision to the copier, preventing copies from being printed. In cases where some of the images of the copyrighted pages are initially unavailable, the system can be used to compare copied pages against each other and to keep statistics. If the same page is copied on many occasions, it can be inspected for addition to the corpus of copyrighted pages. This is achieved by maintaining a database of unknown documents. Once a large cluster of similar pages has accumulated, it is inspected and either tagged with copyright information and added to the copyright database or discarded. Sequences of copying unknown documents are tracked and presented together to simplify identifying copyrighted materials. In addition to copiers, this system can be used in many other imaging devices such as smartphone applications using the phone camera if they are used for making copies of copyrighted materials. Any imaging device that can produce a digital image as part of the copying process could be connected to the described system. Therefore, the inventive concepts described herein are not limited to digital copiers alone.

It should be further noted that many multifunction copiers offer security settings where an electronic badge or a pin code is required to use the copier. In one or more embodiments, such authentication information is included in the process of the described system, providing a more detailed record of who makes copies, either for accounting or copy prevention.

In addition, most multifunction copiers provide activity logs including time stamp, the number of copies, and authentication information. Optionally, many multifunction copiers have the capability to save a digital image for each made copy. Through a modular architecture, an embodiment of the described system accesses such information for different makes and models of multifunction copiers or other imaging devices. Alternatively, it may be possible for the multifunction copier to initiate a network connection to a server to upload such information to the server. The server may also be embedded in the multifunction copier.

FIG. 1 illustrates components of an exemplary embodiment 100 of the described system for tracking the copying of printed materials owned by rights holders. In the shown embodiment, the overall system architecture includes several components described in detail below. The multifunction copier 101 saves a digital image 102 for each copy of the original page 103 and records additional information in the activity log. The image processing server 104 operating in conjunction with the image database 106 computes a digital fingerprint 105 of each digital image that is sufficient to find matches in a database. In one embodiment, the image processing server 104 may process the images from several multifunction copiers 101. Communication between the multifunction copier 101 and the image processing server 104 may be initiated from either end. For privacy or efficiency reasons, the image processing server 104 may be located on the same premises as the multifunction copier 101. In such a setup, the digital images would not need to leave the premises, either to conserve network bandwidth or to prevent that private, non-copyrighted images would be visible to copyright holders or their agents.

In one or more embodiments, a database retrieval server 107 matches the digital fingerprint 105 against a database 108 of digital fingerprints of copyrighted pages. Many different approaches may be used in this server such as an inverted index from image features to database images containing those features, hashing, brute force search, or other approaches that accurately locate all matching images. Positive matches are recorded for notifications and future reports 111. Positive matches may also be reported to the multifunction copier 101 and the image processing server 104 to influence the printing behavior and to control the retention of copied images.

In one or more embodiments, it is possible that images of the copyrighted material may initially not be available. In this situation, the database retrieval server 107 maintains a separate unknown documents database 109. Digital fingerprints that do not match the copyright database are added to this unknown documents database 109. Submitted digital fingerprints are also checked against the unknown documents database 109. Matches are reported to the business process manager 110 that maintains statistics for digital fingerprints that match each other. Those matches are clustered such that all digital fingerprints in a cluster match each other. Once the count for a cluster of digital fingerprints exceeds a threshold defined by the business process manager 110, a human is asked to inspect the corresponding images. Alternatively, a periodic process, e.g., once per week collects all clusters above a certain size and presents them for inspection. There also needs to be a periodic process that removes digital fingerprints from the unknown documents database 109 that have not been matched by anything else within a specified time period.

In one or more embodiments, the aforesaid image matching process may include generating a vocabulary of visual words in the aforesaid databases of the unknown and copyrighted images. This vocabulary of visual words is created from all the images in both the copyrighted and unknown image databases. In one or more embodiments, the aforesaid vocabulary may be updated periodically after many new images have been received, either from ingest or unknown images. After that, image features for image key points are extracted for each of the images in the respective database. Subsequently, based on the extracted image features, an index pointing from the visual words in the vocabulary to images from the plurality of stored images, which contain these visual words is created. Using the created index, all other images stored in the respective database that share at least one visual word with the retrieved image are collected and a number of shared visual words is determined. Finally, a geometric verification is performed to verify whether the shared visual words are located at same locations in the retrieved image and the other images of the stored images and taking a fraction of verified shared visual words to all shared visual words as a similarity measure. The aforesaid similarity measure may then be checked against a threshold to determine is a close match has been made. The above-described process is performed for both the copyrighted image database and the unknown image database. In one embodiment, both databases share the vocabulary and each database has its own inverted index.

Figure 2:
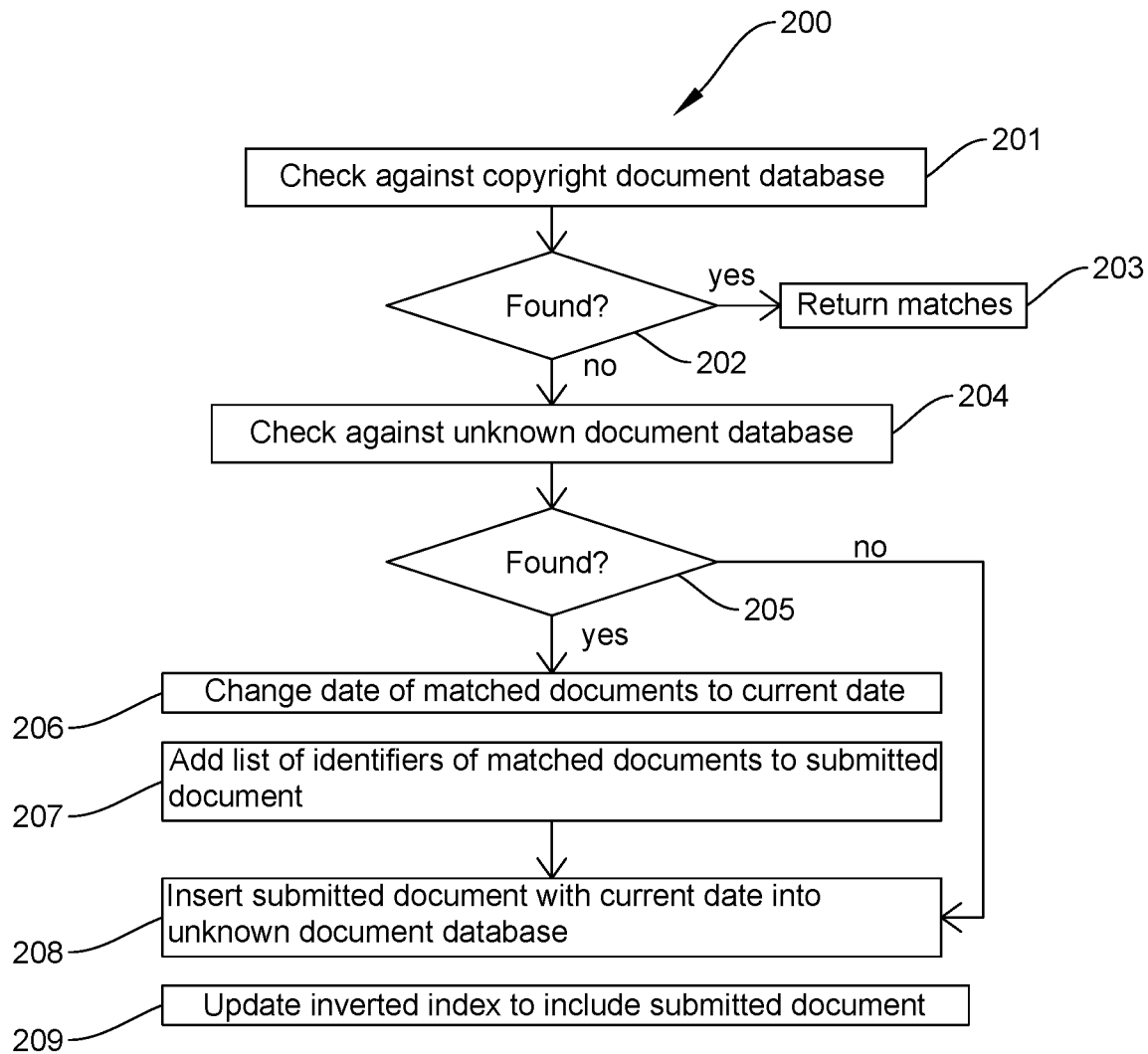
FIG. 2 illustrates a flow chart of an exemplary embodiment of a match process.

FIG. 2 illustrates a flow chart of an exemplary embodiment of a match process 200. First, at step 201, the digital fingerprint of the digital image is checked against the records stored in the copyright document database 108. If the match is found in step 202, the match is returned, see step 203. Otherwise, if no match is found, the digital fingerprint of the digital image is checked against the unknown documents database 109, see step 204. If the match is found in step 205, the date of the matched document is changed to the current date, see step 206. At step 207, a list of identifiers of the matched documents is added to the submitted document corresponding to the digital image. At step 208, the submitted document is inserted with the current date and time into the unknown documents database 109. Finally, at step 209, the inverted index of the unknown documents stored in the unknown documents database 109 is updated to include the submitted document. If, at step 205, the matching document is not found, the process 200 proceeds directly to the insertion step 208.

Figure 3:
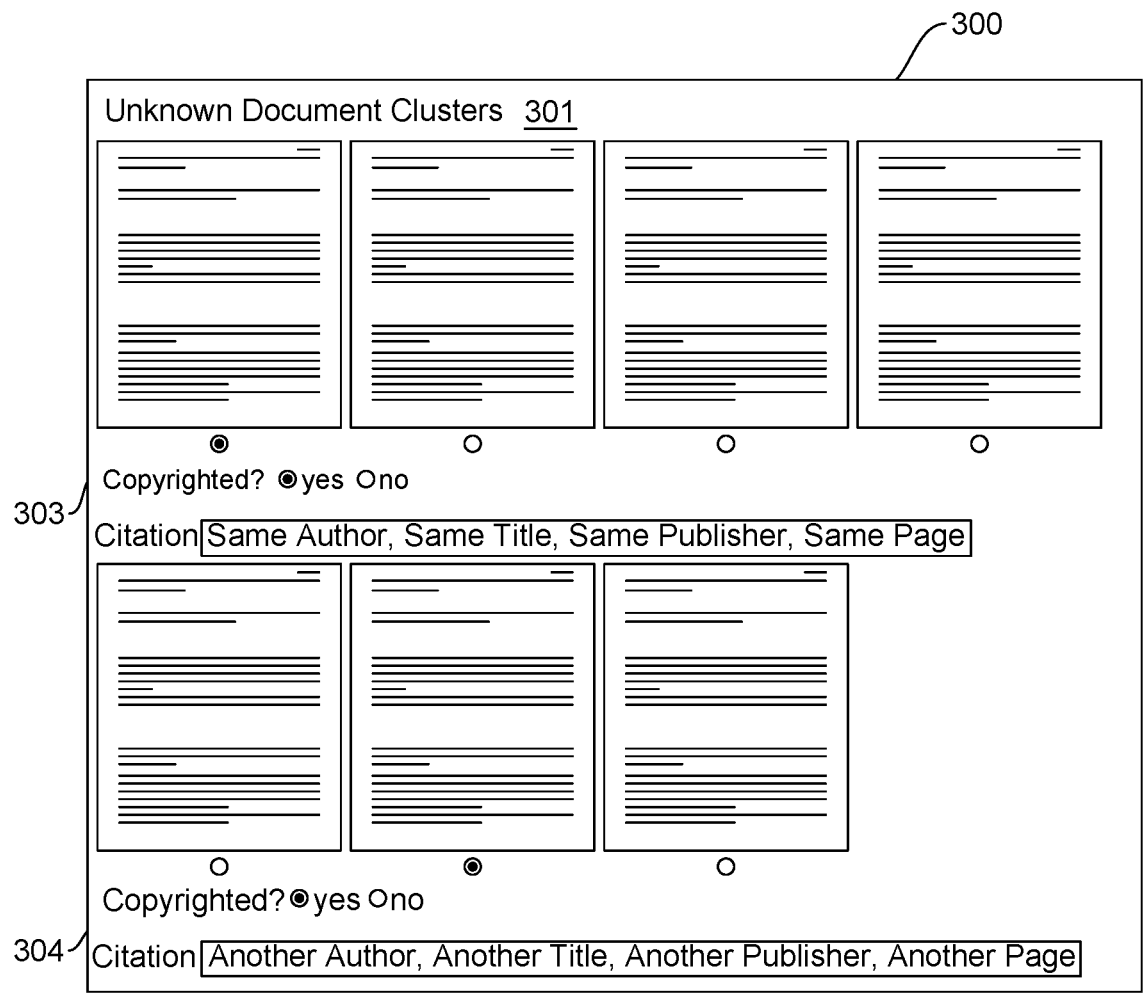
FIG. 3 illustrates an exemplary embodiment of a user interface for identification of copyrighted or non-copyrighted work by a user.

In one or more embodiments, the user may be asked to identify the copyrighted source of unknown documents, e.g., from the page header, using an exemplary user interface 300 shown in FIG. 3. To this end, the system clusters near-duplicate images in the unknown documents database 109 into image clusters 301 and 302 and displays them to the user for marking as copyrighted or not my means of graphical user interface widgets 303 and 304.

In one or more embodiments, after a positive identification, a representative of the corresponding digital images is added to the copyright database 108 together with the rights holder information determined during the inspection. With either inspection result, the cluster of digital fingerprints is removed from the unknown documents database 109 because it is either covered by the information added to the copyright database or it is determined not to be copyrighted.

Figure 4:
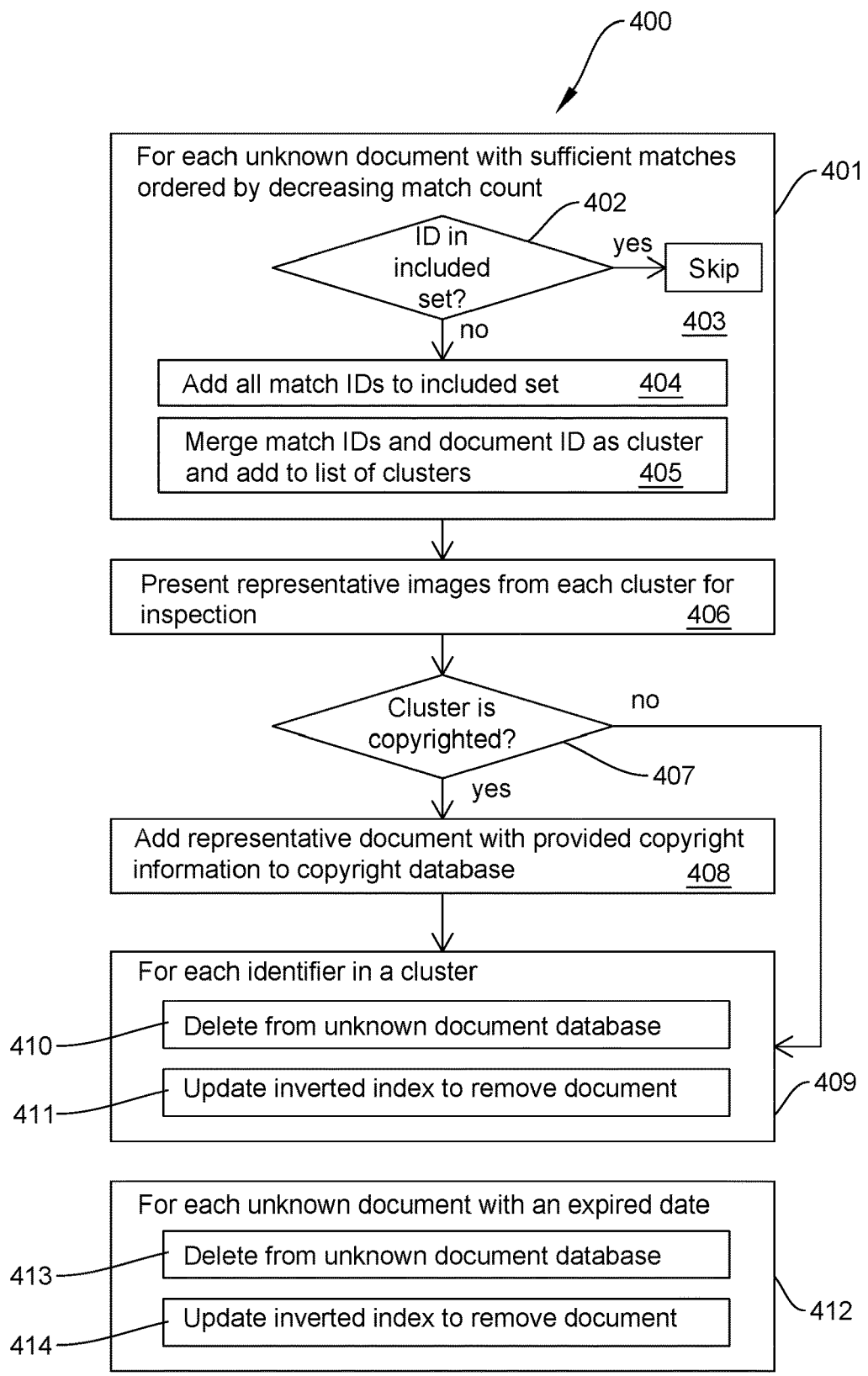
FIG. 4 illustrates an exemplary flow chart for a process for retrieving unknown documents from the unknown document database for inspection to determine if the document is subject to copyright and for purging old documents from the database.

FIG. 4 illustrates an exemplary flow chart for a process 400 for retrieving unknown documents from the unknown documents database 109 for inspection to determine if the document is subject to copyright and for purging old documents from the database 109. Specifically, the following step 401 is performed for each unknown document in the unknown documents database 109, which has sufficient near-duplicate matches. In one embodiment, for purposes of performing the aforesaid step 401, the unknown documents are ordered by decreasing match count.

In one or more embodiments, in the aforesaid step 401, the system checks if a document identifier for an unknown document is included in the set of matching documents, see sub-step 402. If so, the system skips the remaining operations of this step 401. Otherwise, the system adds matching document identifiers to the included set, see sub-step 404. Subsequently, at sub-step 405, the system merge matches identifiers and the document identifier as a cluster and adds it to the list of clusters.

In one or more embodiments, at step 406, the system presents representative images from each cluster on a display device for inspection by the user, using, for example, the user interface shown in FIG. 3. At step 407, the system determines, based on user's input, whether the document cluster is copyrighted. If so, at step 408, the representative document with provided copyright information is added to the copyright database 108. Subsequently, at step 409, performed for each identifier in the cluster, the system deletes the corresponding cluster from the unknown documents database 109, see sub-step 410, and updates the inverted index to remove the corresponding document, see sub-step 411.

In one or more embodiments, at step 412, performed (periodically) for each unknown document having an expired date, the system deletes such document from the unknown documents database 109, see sub-step 413, and then updates the inverted index to remove this document, see sub-step 414.

In one or more embodiments, sequences of copying unknown documents can be tracked and presented together. For example, all sheets copied at the same copier in the same copy job can be grouped into a sequence. In cases when a copy job is not tracked, for example, when copying pages from a book without the help of an automatic document feeder, reasonable gaps between copies such as one or two minutes may be used instead. Presenting sequences together helps the user charged with identifying the copyrighted source of unknown documents. Even if some pages are difficult to define, they could be identified from the context of other pages, for example, the title page of an article.

Figure 5:
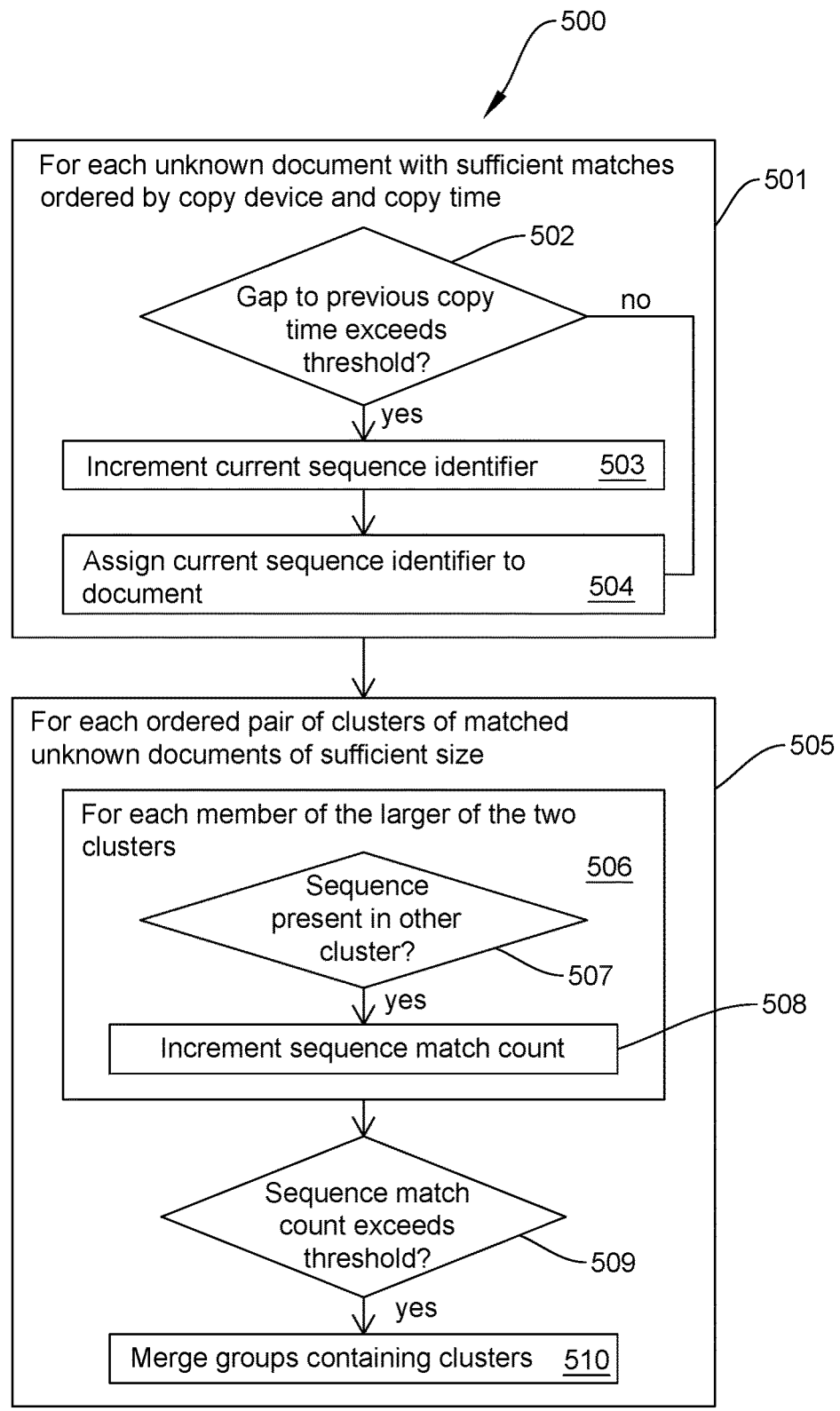
FIG. 5 illustrates an exemplary embodiment of a process for grouping clusters of almost identical images into temporal sequences.

In one or more embodiments, grouping clusters of almost identical images into temporal sequences can be accomplished with a simple approach illustrates in FIG. 5. First, for all images of that exceed the threshold discussed earlier, one can loop through them ordered by copy device and copy time, see step 501. All images in the same copy job or in a sequence not interrupted by a gap of specified duration are assigned the same sequence identifier, see steps 502 and 503. Second, each cluster of almost identical images is initially assigned to its own group. For all ordered pairs of clusters and all members of the larger of those clusters (step 505), it is checked if there is a member in the other cluster that belongs to the same sequence, see sub-step 506 and the sequence match count is incremented, see sub-step 508. If the count of those matches exceeds a threshold (sub-step 509), for example, half the number of members in the first cluster, the groups the two clusters belong to are merged (sub-step 510). It should be noted that the above description described just one exemplary embodiment of a process for grouping by sequence membership. On the other hand, many other clustering techniques may be used instead. Accordingly, the invention is not limited to the described clustering technique examples.

In one or more embodiments, the image processing server 104 and the database retrieval server 107 shown in FIG. 1 may be in different or the same location and even be implemented by the same server. Keeping the image processing server near the multifunction copier 101 provides advantages for privacy, and conservation of network bandwidth for transferring images, and distributed computation of digital fingerprints. On the other hand, having the image processing server 104 at a central location offers advantages of serviceability and protection against tempering. Business requirements determine which setup would be used. In one embodiment, the database retrieval server 107 with the copyright database 108 and the unknown documents database 109 may share the same server. If they are on different servers, the image processing server has to submit the digital fingerprint to the unknown documents database 109 after the copyright database returns a failed match. For improved performance, the database retrieval server may be distributed with each database containing only a subset of the copyrighted documents. In that case, the image processing server 104 would submit the fingerprint to all database retrieval servers 107 and accept a match from any of them.

In one or more embodiments, the digital fingerprint of an image consists of detected keypoint features by an algorithm such as SIFT described in detail in U.S. Pat. No. 6,711,293, incorporated herein by reference. Such features consist of a vector of descriptors, coordinates in the image, and other information such as the keypoint orientation. In one embodiment, a vector of feature descriptors is mapped to a visual word or a quantized digital fingerprint, a number determined by clustering a training set of feature descriptors. FIG. 6 illustrates an example of four descriptor vectors with the corresponding visual words. Similar vectors are assigned the same visual word.

In one embodiment, visual words contained in an image are matched against the database of copyrighted images by locating images containing the same visual words via an inverted index and using a bag-of-words approach to determine the best matches. In one embodiment, a geometric verification step is applied to those matches such many of the matching visual words have to be located in the same locations in the matching images. In one embodiment, a further step is conducted of verifying uniformity of distribution of the shared visual words over the other images and rejecting the other images with uniformity of distribution of the shared visual words below a predetermined threshold. Such verification may divide images into a coarse grid, determine the matching fraction in each grid cell, and perform a statistical test, as described, for example, in U.S. patent application Ser. No. 15/663,815, incorporated herein by reference.

In one or more embodiments, a business process manager 110 that contains rules to determine what steps to take if a copied image is contained in the database of copyrighted pages. Some rules would collect the information for the copied image such as the authentication of the person making the copies and the information about the page in the database such as containing work and owner. Such rules may just record the action for later accounting or send a notification to the copyright owner. Other rules would check the authentication of the person, determine a license status, and possibly prevent the printing of the copied page. Rules would determine how long to retain the digital images of the copied pages.

In one or more embodiments, with the exception of cases where copying is prevented, the aforesaid process is invisible to the person making the copies and does not interfere with their workflow. Thus, it can be expected that the user compliance with reporting requirements for the copying of copyrighted works will be substantially higher.

Figure 7:
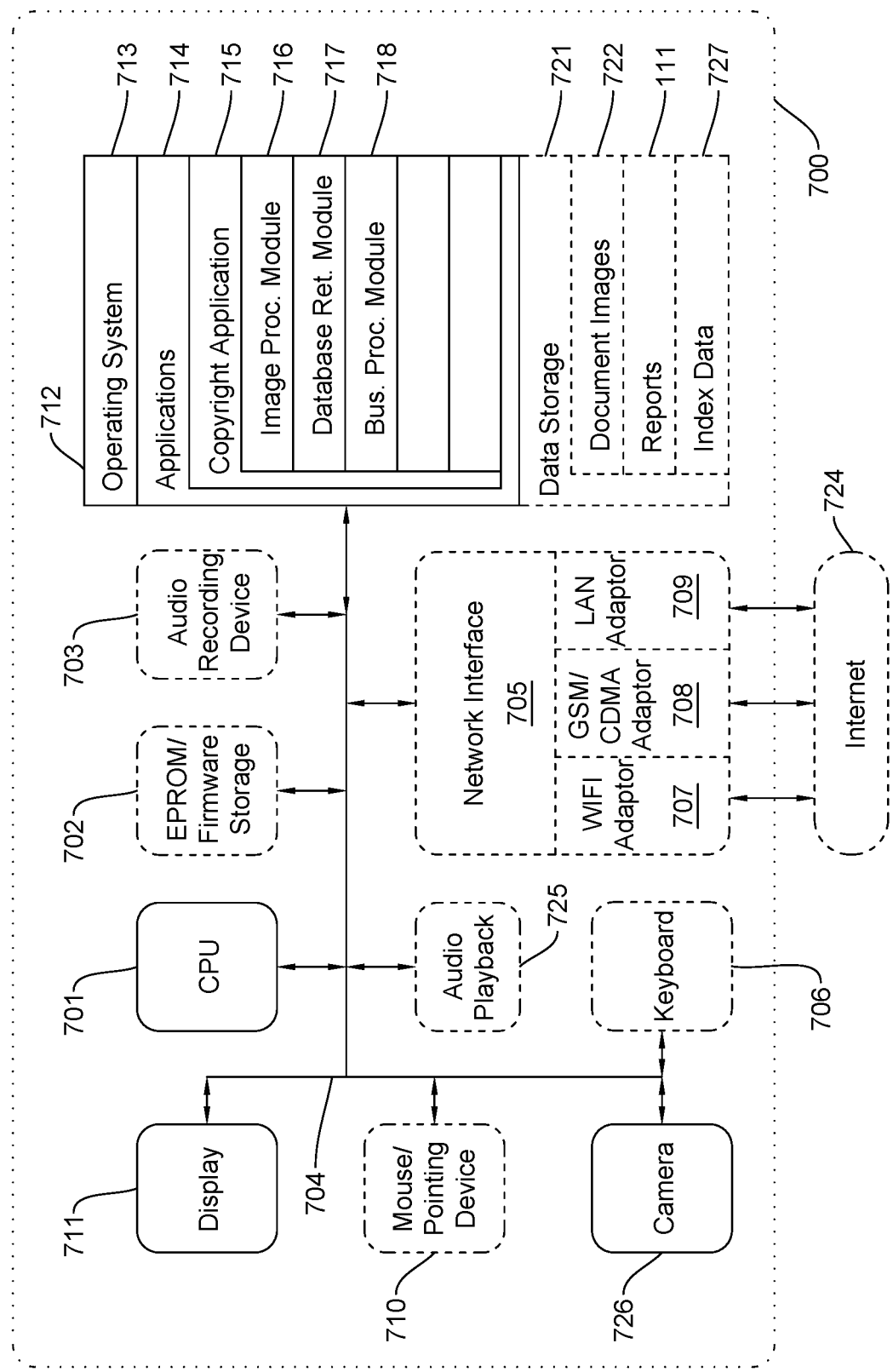
FIG. 7 illustrates an exemplary embodiment of a computerized system for tracking the copying of printed materials owned by rights holders.

FIG. 7 illustrates an exemplary embodiment of a computerized system 700 for tracking the copying of printed materials owned by rights holders. In one or more embodiments, the computerized system 700 may be implemented within the form factor of a desktop computer well known to persons of skill in the art. In an alternative embodiment, the computerized system 700 may be implemented based on a laptop or a notebook computer or any other mobile computing device, such as a smartphone or a tablet computer.

The computerized system 700 may include a data bus 704 or other interconnect or communication mechanism for communicating information across and among various hardware components of the computerized system 700, and a central processing unit (CPU or simply processor) 701 electrically coupled with the data bus 704 for processing information and performing other computational and control tasks. Computerized system 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, computerized system 700 may further include a read only memory (ROM or EPROM) 702 or other static storage device coupled to the data bus 704 for storing static information and instructions for the processor 701, such as firmware necessary for the operation of the computerized system 700, basic input-output system (BIOS), as well as various configuration parameters of the computerized system 700.

In one or more embodiments, the computerized system 700 may incorporate a display device 711, which may be also electrically coupled to the data bus 704, for displaying various information to a user of the computerized system 700, such as the user interfaces showing the clustered document images as described herein. In an alternative embodiment, the display device 711 may be associated with a graphics controller and/or graphics processor (not shown). The display device 711 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 711 may be incorporated into the same general enclosure with the remaining components of the computerized system 700. In an alternative embodiment, the display device 711 may be positioned outside of such enclosure, such as on the surface of a table or a desk. In one or more embodiments, the computerized system 700 may further incorporate an audio capture device 703, such as a microphone.

In one or more embodiments, the computerized system 700 may further incorporate an audio playback device 725 electrically connected to the data bus 704 and configured to play various audio files, such as MPEG-3 files, or audio tracks of various video files, such as MPEG-4 files, well known to persons of ordinary skill in the art. To this end, the computerized system 700 may also incorporate waive or sound processor or a similar device (not shown).

In one or more embodiments, the computerized system 700 may incorporate one or more input devices, such as a mouse/pointing device 710, such as a mouse, a trackball, a touchpad, or cursor direction keys for communicating direction information and command selections to the processor 701 and for controlling cursor movement on the display 711. This input device typically has two degrees of freedom in two axes, a first axis (e.g., x) and a second axis (e.g., y), that allows the device to specify positions in a plane.

The computerized system 700 may further incorporate a camera 726 for acquiring still images and video of various objects, including the document images described herein, as well as a keyboard 706, which all may be coupled to the data bus 704 for communicating information, including, without limitation, images and video, as well as user commands (including gestures) to the processor 701.

In one or more embodiments, the computerized system 700 may additionally include a communication interface, such as a network interface 705 coupled to the data bus 704. The network interface 705 may be configured to establish a connection between the computerized system 700 and the Internet 724 using at least one of a WIFI interface 707, a cellular network (GSM or CDMA) adaptor 708 and/or local area network (LAN) adaptor 709. The network interface 705 may be configured to enable a two-way data communication between the computerized system 700 and the Internet 724. The WIFI adaptor 707 may operate in compliance with 802.11a, 802.11b, 802.11g and/or 802.11n protocols as well as Bluetooth protocol well known to persons of ordinary skill in the art. The LAN adaptor 709 of the computerized system 700 may be implemented, for example, using an integrated services digital network (ISDN) card or a modem to provide a data communication connection to a corresponding type of telephone line, which is interfaced with the Internet 724 using Internet service provider's hardware (not shown). As another example, the LAN adaptor 709 may be a local area network interface card (LAN NIC) to provide a data communication connection to a compatible LAN and the Internet 724. In an exemplary implementation, the WIFI adaptor 707, the cellular network (GSM or CDMA) adaptor 708 and/or the LAN adaptor 709 send and receive electrical or electromagnetic signals that carry digital data streams representing various types of information.

In one or more embodiments, the Internet 724 typically provides data communication through one or more sub-networks to other network resources. Thus, the computerized system 700 is capable of accessing a variety of network resources located anywhere on the Internet 724, such as remote media servers, web servers, other content servers as well as other network data storage resources. In one or more embodiments, the computerized system 700 is configured to send and receive messages, media and other data, including application program code, through a variety of network(s) including the Internet 724 by means of the network interface 705. In the Internet example, when the computerized system 700 acts as a network client, it may request code or data for an application program executing on the computerized system 700. Similarly, it may send various data or computer code to other network resources.

In one or more embodiments, the functionality described herein is implemented by computerized system 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 701 for execution. For example, the instructions may initially be carried on a magnetic disk from a remote computer. Alternatively, a remote computer can load the instructions into its dynamic memory and send the instructions over the Internet 724. Specifically, the computer instructions may be downloaded into the memory 712 of the computerized system 700 from the foresaid remote computer via the Internet 724 using a variety of network data communication protocols well known in the art.

In one or more embodiments, the memory 712 of the computerized system 700 may store any of the following software programs, applications or modules:

1. Operating system (OS) 713 for implementing basic system services and managing various hardware components of the computerized system 700. Exemplary embodiments of the operating system 713 are well known to persons of skill in the art, and may include any now known or later developed mobile operating systems.

2. Applications 714 may include, for example, a set of software applications executed by the processor 701 of the computerized system 700, which cause the computerized system 700 to perform certain predetermined functions, such as display the graphical user interface(s) on the display device 711 or capture document images using the camera 726. In one or more embodiments, the applications 714 may include an inventive application 715 for tracking copying of printed materials owned by rights holders.

3. Data storage 721 may store, for example, various data structures 722 such as the image database 106, copyright database 108 and/or unknown documents database 109. In addition, the data storage 721 may include the generated reports 111 as well as index data 727.

In one or more embodiments, the inventive application 715 for tracking copying of printed materials owned by rights holders incorporates an image processing server module 716 configured to perform image processing described above and generate the digital fingerprint 105. In addition, there may be provided a database retrieval module 717 for performing the comparison operations described above. Yet additionally, there may be provided a business process manager module 718 for generating various reports 111.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for tracking copying of printed materials owned by rights holders. It is intended that the specification and examples be considered as exemplary only, with a true scope and spirit of the invention being indicated by the following claims.

What is claimed is:

1. A computer-implemented method for tracking copying of a printed material owned by a rights holder, the computer-implemented method being performed in connection with a computerized system comprising a central processing unit and a memory, the computer-implemented method comprising:
   a. retrieving an image from a copy device;
   b. performing image processing to obtain a digital fingerprint for the retrieved image;
   c. matching the obtained digital fingerprint with fingerprints of a plurality of copyrighted images;
   d. if no match is found, matching the obtained digital fingerprint with fingerprints of a plurality of unknown images;
   e. adding the retrieved image into the plurality of unknown images;
   f. upon adding of the retrieved image into the plurality of unknown images, clustering the retrieved image and at least some of the plurality of unknown images into one or more clusters of near-duplicate images; and
   g. grouping clusters of near-duplicate images into temporal cluster sequences based on a temporal proximity between pairs of unknown images within different clusters of near-duplicate images.

2. The computer-implemented method of claim 1, wherein in step c. the matching is a full-page matching.

3. The computer-implemented method of claim 1, wherein in i, the matching is a full-page matching.

4. The computer-implemented method of claim 1, wherein the clustering is based on a similarity between the retrieved image and the unknown images in the plurality of unknown images.

5. The computer-implemented method of claim 1, wherein further comprising selecting a representative document for the near-duplicate image cluster.

6. The computer-implemented method of claim 5, further comprising displaying the representative document for the near-duplicate image cluster to a user.

7. The computer-implemented method of claim 6, further comprising, for each displayed representative document, receiving user designation of the displayed representative document as being copyrighted or non-copyrighted.

8. The computer-implemented method of claim 7, further comprising, if the user designated the displayed representative document as being copyrighted, removing the near-duplicate image cluster from the plurality of unknown images and placing the near-duplicate image cluster into the plurality of copyrighted images.

9. The computer-implemented method of claim 7, further comprising, if the user designated the displayed representative document as being non-copyrighted, removing the near-duplicate image cluster from the plurality of unknown images.

10. The computer-implemented method of claim 1, wherein the matching comprises:
 i. generating a vocabulary of visual words in the plurality of unknown images;
 ii. extracting image features for image key points for each of the plurality of unknown images;
 iii. based on the extracted image features, creating an index pointing from the visual words in the vocabulary to images from the plurality of unknown images, which contain these visual words;
 iv. using the created index to collect all other images of the plurality of unknown images that share at least one visual word with the retrieved image and determining a number of shared visual words; and
 v. performing a geometric verification to verify whether the shared visual words are located at same locations in the retrieved image and the other images of the plurality of unknown images and taking a fraction of verified shared visual words to all shared visual words as a similarity measure.

11. The computer-implemented method of claim 5, wherein the vocabulary of visual words is generated from a set of image features extracted from a collection of representative images.

12. The computer-implemented method of claim 1, wherein the plurality of unknown images is stored in an unknown image database.

13. The computer-implemented method of claim 1, further comprising, if a match is found, generating a notification to the rights holder.

14. The computer-implemented method of claim 1, further comprising, if a match is found, preventing the copy device from copying the retrieved image.

15. The computer-implemented method of claim 1, further comprising, if a match is found, generating a report comprising information on the copying of the retrieved image by the copy device.

16. The computer-implemented method of claim 1, wherein the plurality of copyrighted images is stored in a copyrighted image database.

17. A computerized system for tracking copying of a printed material owned by a rights holder, the computerized system comprising a central processing unit and a memory storing a set of computer-executable instructions for:
 a. retrieving an image from a copy device;
 b. performing image processing to obtain a digital fingerprint for the retrieved image;
 c. matching the obtained digital fingerprint with fingerprints of a plurality of copyrighted images;
 d. if no match is found, matching the obtained digital fingerprint with fingerprints of a plurality of unknown images;
 e. adding the retrieved image into the plurality of unknown images;
 f. upon adding of the retrieved image into the plurality of unknown images, clustering the retrieved image and at least some of the plurality of unknown images into one or more clusters of near-duplicate images; and
 g. grouping clusters of near-duplicate images into temporal cluster sequences based on a temporal proximity between pairs of unknown images within different clusters of near-duplicate images.

18. A non-transitory computer-readable medium embodying a set of computer-executable instructions, which, when executed in a computerized system comprising a central processing unit and a memory, cause the computerized system to perform a method for tracking copying of a printed material owned by a rights holder, the method comprising:
 a. retrieving an image from a copy device;
 b. performing image processing to obtain a digital fingerprint for the retrieved image;
 c. matching the obtained digital fingerprint with fingerprints of a plurality of copyrighted images;
 d. if no match is found, matching the obtained digital fingerprint with fingerprints of a plurality of unknown images;
 e. adding the retrieved image into the plurality of unknown images;
 f. upon adding of the retrieved image into the plurality of unknown images, clustering the retrieved image and at least some of the plurality of unknown images into one or more clusters of near-duplicate images; and
 g. grouping clusters of near-duplicate images into temporal cluster sequences based on a temporal proximity between pairs of unknown images within different clusters of near-duplicate images.

* * * * *